May 17, 1938. S. MECKLER 2,117,899

EGG YOLK AND WHITE SEPARATOR

Filed July 24, 1937

INVENTOR:
Samuel Meckler
BY David E. Carlsen
ATTORNEY.

Patented May 17, 1938

2,117,899

UNITED STATES PATENT OFFICE 2,117,899

EGG YOLK AND WHITE SEPARATOR

Samuel Meckler, St. Paul, Minn.

Application July 24, 1937, Serial No. 155,482

2 Claims. (Cl. 146—2)

My invention relates to culinary articles in general and more particularly to a device for separating the whites and yolks of eggs.

In the culinary art it is well known that eggs are used in various quantities and recipes require varying quantities of egg yolks, or egg whites or both. For this purpose I have designed a simple, highly efficient and inexpensive kitchen utensil as hereinafter fully set forth, reference being had to the accompanying drawing, in which:—

Figure 1:
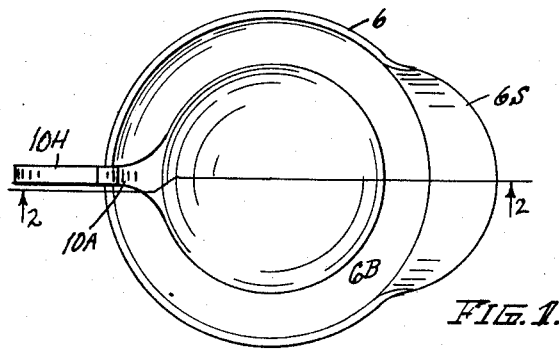
Fig. 1 is a top or plan view of my improved egg yolk and white separator.

Referring to the drawing by reference numerals, like characters designating corresponding parts in the various views, 6 designates a preferably spun metal bowl with a horizontal and outwardly directed spout 6S, said bowl reduced in diameter downwardly to a tubular outlet 6A and intermediate the wide upper part and relatively smaller lower part thus forming a circular shoulder 6B adapted to rest concentrically on the upper rim of any suitable receptacle 7 with the spout 6S projecting radially and outwardly from the rim of the receptacle.

In the outlet 6A is pivotally mounted a plate valve 8 normally closing it to retain liquids 9 therein but permitting discharge of the liquid when the valve is opened by tilting.

Figure 3:
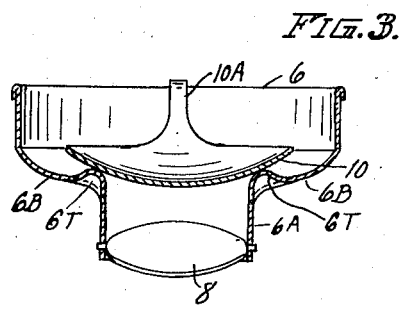
Fig. 3 is a transverse section of the device as on line 3—3 in Fig. 2 showing its outlet valve open.

10 is an egg-yolk-receiving member of sheet metal, of round spoon-like form, said member having an integral handle extension or arm 10A arched to rest on the rim of the bowl 6 and has a finger hold 10H accessible exteriorly of said rim, the member normally lying in horizontal plane concentric of and within the bowl but spaced over the shoulder 6B by any suitable spacing means such as the inwardly and upwardly directed bosses 6T (see Fig. 3) integral of the bowl. This provides a circular opening under the spoon 10 and permits flow of liquid downwardly thereunder into the outlet 6A.

Figure 2:
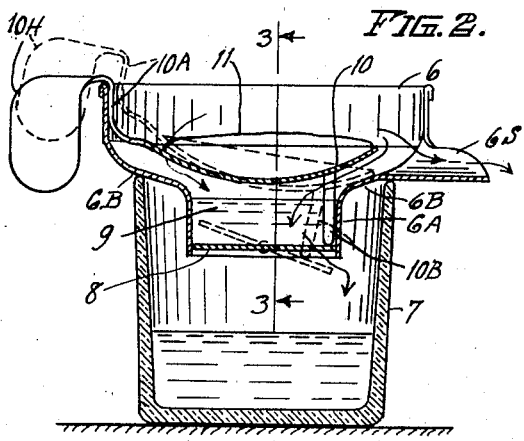
Fig. 2 is a longitudinal, vertical section as on line 2—2 in Fig. 1 and showing the device mounted in operative position on a vessel.

In Fig. 2, 10B designates a downwardly projecting arm extending from the under side of the spoon 10 within outlet 6A and its lower extremity close to the valve plate 8. Thus when the yolk member is tipped up at its rear end and its front end thereby tipped down arm 10B will contact and push the plate valve down, tilting it enough to discharge liquid 9 into vessel 7 (see Figs. 2 and 3).

Figure 4:
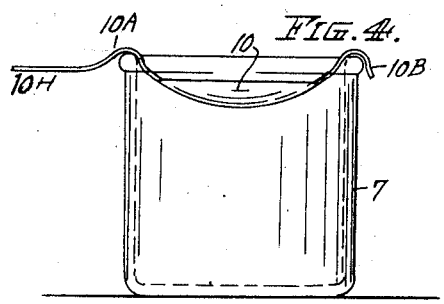
Fig. 4 is a side elevation of a modified form of my device on a vessel.
Figure 5:
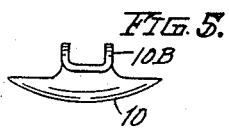
Fig. 5 is a front end elevation of the modified form only.

In Figs. 4 and 5 the yolk member 10 is removably retained concentrically within the open end of vessel 7 by the upwardly offset integral handle 10A extending radially from the yolk member at its rear side and 10B is a forwardly directed and downwardly open hook member contacting the rim of the receptacle at the diametrically opposite side thereof from where the handle member rests. Thus the yolk member is removably supported in position concentric of the open top of the receptacle and preferably on a level below the upper rim of the receptacle, as shown.

In the use of the device the operator merely breaks an egg in the usual manner, then holding it directly over the center of the bowl 6 drops the yolk into the spoon part, the yoke filling the said spoon member as to line 11 in Fig. 2, to or over the rim, the more liquid white of the egg runs over the sides, thence under the spoon and into the outlet 6A, thence into the receptacle 7 when the valve is open as described.

In the modified form Figs. 4 and 5 there is no bowl 6, the egg yolk being received in the spoon member and the whites running and dripping directly into the receptacle 7.

In breaking a number of eggs and separating the yolks and whites thereof it may occur that a putrid egg will be broken. Obviously in such cases my device is doubly useful in as much as it receives the contents of only one egg at a time and the spoiled egg does not get into the receptacle, assuming of course that valve 8 is closed. The putrid egg may of course be removed by lifting the entire device off of the receptacle and disposing of it.

Assuming that a yolk and the white of an egg have been separated (see Fig. 2), the yolk may be removed by lifting the spoon member out of the device or it may be poured out of spout 6S by simply tilting the yolk holder up at the handle end the front end of the holder simultaneously tilting down and contacting the bowl inwardly of the spout 6S and the yolk will run out through said spout. Simultaneously the valve 8 is opened as described and the egg whites discharge into the receptacle 7.

I have now fully described the preferred construction and the use of my device. It is obvious that modifications in structure may be made without departing from the scope and spirit of the invention and the following claims:

I claim:

1. In a separator device of the class described, a bowl with a downwardly directed and reduced outlet concentric of the bowl, an outlet spout directed horizontally from the side of the bowl and above said outlet, a yolk receiving spoon member supported concentrically within the bowl and in spaced relation over its outlet, and a valve in said outlet, and means for opening said valve actuated by tilting movement of said yolk member toward the spout to simultaneously cause discharge of the egg yolk from the spout and discharge the white of the egg from the bowl outlet.

2. In a separator device of the class described, a bowl-like member with a downwardly directed and central outlet, a yolk receiving spoon member supported concentrically within the bowl over said outlet, said spoon member of a capacity corresponding to a yolk of an egg and adapted to simultaneously retain the white of the egg in the bowl, and means for discharging said white of the egg by removal of the said spoon from said central position.

SAMUEL MECKLER.